United States Patent [19]

Rumell

[11] 3,788,683
[45] Jan. 29, 1974

[54] TRANSPORT VEHICLE WITH PORTABLE CARGO CONTAINER

[76] Inventor: James A. Rumell, 1955 Vermont, Blue Island, Ill. 60406

[22] Filed: July 10, 1972

[21] Appl. No.: 269,978

Related U.S. Application Data

[63] Continuation-in-part of Ser. No. 27,361, April 10, 1970, abandoned.

[52] U.S. Cl............ 296/35 A, 214/515, 280/43.14, 280/43.23, 280/47.11
[51] Int. Cl. ......................... B60s 9/14, B62d 27/06
[58] Field of Search........... 280/43.14, 43.23, 47.11; 296/35 A; 214/515

[56] References Cited
UNITED STATES PATENTS

| | | | |
|---|---|---|---|
| 2,304,418 | 12/1942 | McMurry..................... | 280/43.23 X |
| 3,002,760 | 10/1961 | Lee................... | 280/43.23 |
| 3,489,427 | 1/1970 | Vearnals et al................. | 280/43.23 |
| 3,486,787 | 12/1969 | Campbell........................ | 296/35 A |
| 1,892,406 | 12/1932 | Meyercord et al. ......... | 280/43.23 X |
| 2,129,340 | 9/1938 | Webber............................ | 214/515 |
| 2,412,158 | 12/1946 | Kuehlman....................... | 214/515 X |
| 2,956,699 | 10/1960 | Payne................................. | 214/515 |
| 2,388,692 | 11/1945 | House.............................. | 280/47.11 |

Primary Examiner—David Schonberg
Assistant Examiner—Leslie J. Paperner
Attorney, Agent, or Firm—Wolfe, Hubbard, Leydig, Voit & Osann, Ltd.

[57] ABSTRACT

A transport vehicle having a wheeled bed and a removable and reusable freight hauling and storing container which is releasably mounted on the bed to form the transport body of the vehicle. The container includes a rectangular base and frame with upstanding side and end walls defining a freight receiving area. Retractable and extensible dolly wheels are located near the corners of the base at one end thereof and near the center of the base at the other end; and a self-contained hydraulic system retracts or extends the wheels to convert the container from an immobile frame-based storing container to a mobile wheeled hauling container. The wheels are all within the rectangular frame so that the resulting container may be maneuvered about a loading area, or onto or off a ship or dock, without requiring high-capacity cranes or other special container-handling facilities.

8 Claims, 8 Drawing Figures

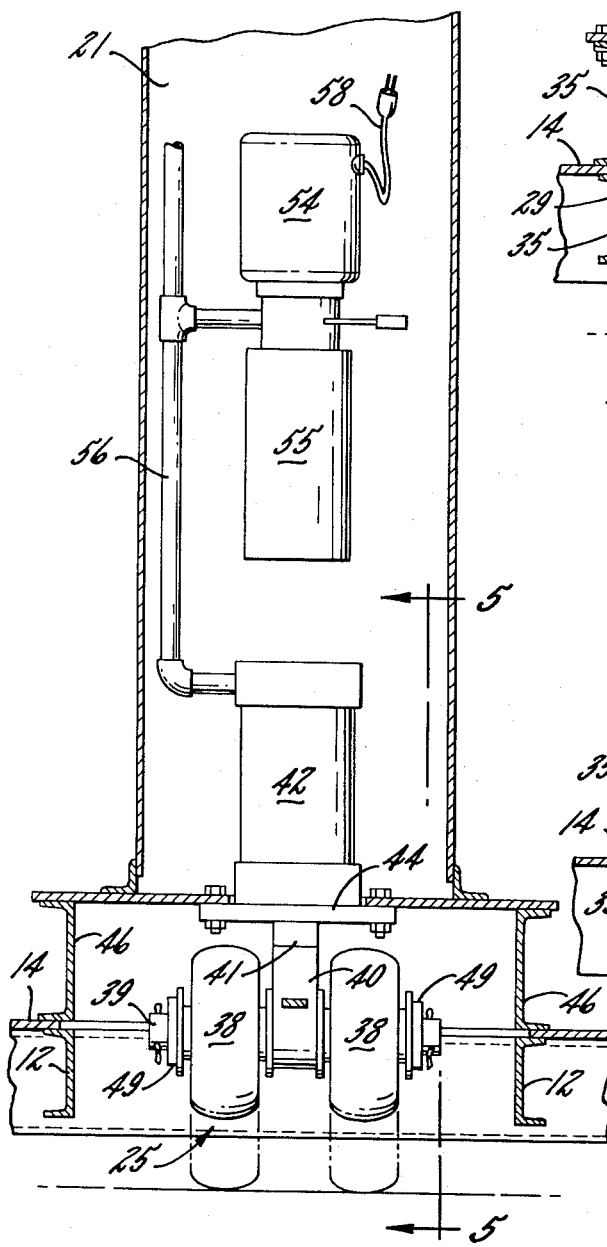
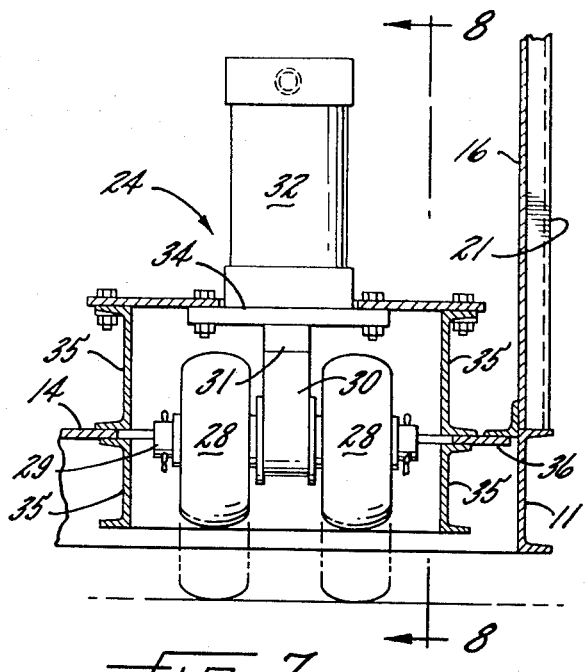
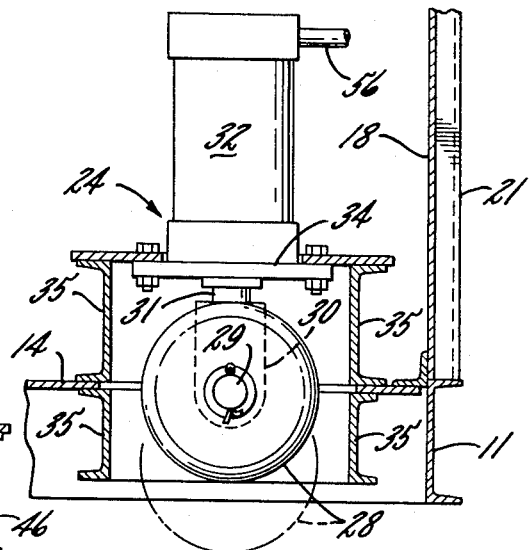

3,788,683

TRANSPORT VEHICLE WITH PORTABLE CARGO CONTAINER

This application is a continuation-in-part of the application of James A. Rumell, Ser. No. 27,361, filed Apr. 10, 1970 and now abandoned.

The present invention relates generally to transport vehicles and more particularly to vehicles which have a removable cargo carrying container, commonly referred to as an "intermodal" or "land-sea" container. In a particular aspect, the invention concerns a system for hauling and storing freight in which the container is transported as an integral unit, both on land and aboard ship, and where special container handling facilities are unavailable.

Considerable interest has developed over the past several years in transportation of "intermodal" containers over both land and water. These containers are designed for transport by truck or rail to a ship loading dock, where they then may be transferred to the ship for overseas delivery.

At present, virtually all of the commercially suitable intermodal containers that are carried by trucks or rail can only be handled by special equipment. Containerized shipping necessities custom-designed trucks and trains, special shipboard storage facilities, and heavy cranes to transfer the containers between the ship and loading dock. As a result, sea-land container shipments have been available only at ports where expensive transfer facilities are available.

It is, accordingly, an object of the invention to provide a transport vehicle having as the transport body thereof an intermodal cargo container that is removable from the trailer bed of the vehicle and is readily convertible from an immobile storing container to a mobile wheeled hauling container for easy transfer or placement.

Another object is to provide such an intermodal freight handling and storing container which is transportable by land and by sea without requiring special facilities such as high-capacity cranes. A related object is to provide containerized sea-land shipments utilizing conventionally available land transport and dock facilities, and un-modified marine vessels.

A further object is to provide a transport vehicle of the foregoing type in which the intermodal container has self-contained facilities for converting the container from an immobile storing container to a mobile wheeled hauling container.

Still another object of the invention is to provide a sea-land freight hauling and storing container as characterized above which can be removed from a transport vehicle and positioned closely adjacent similar containers on all four sides.

Other and further aims, objects and advantages of the invention will become apparent as the description of the invention proceeds, taken in conjunction with the annexed drawings.

BRIEF DESCRIPTION OF THE DRAWINGS

FIG. 4 is a front view, taken along lines 4—4 of FIG. 3, illustrating the retracted and, in phantom, extended, positions of the front pivotable dolly and associated hydraulic system;

FIG. 7 is a partial view, taken along lines 7—7 of FIG. 3, illustrating one of the rear retractable and extensible dollies and its associated hydraulic jack mechanism; again, the retracted position is shown in solid lines while the extended position is in phantom;

FIG. 8 is a partial side view, taken in section along lines 8—8 of FIG. 7, showing one of the rear dollies in retracted (solid lines) and extended (phantom lines) positions.

Figure 1:
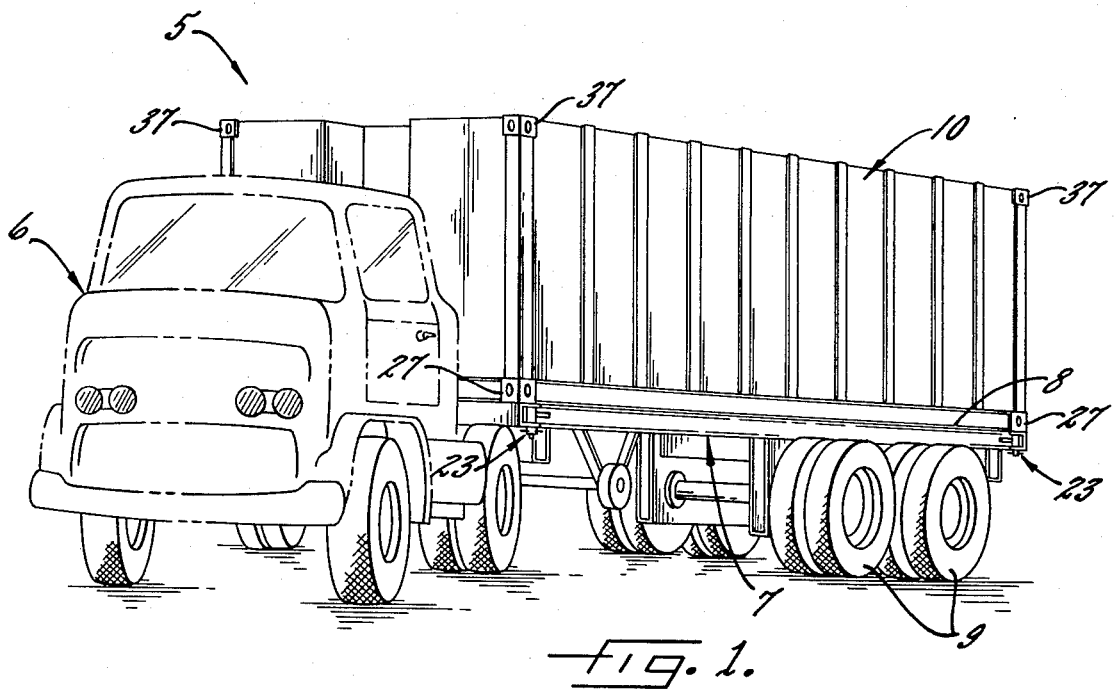
FIG. 1 is a perspective of a transport vehicle having a removable freight hauling and storing container embodying the invention.

While the invention will be described in connection with a preferred embodiment, it will be understood that it is not intended to limit the invention to this particular embodiment. On the contrary, it is intended to cover all alternatives, modifications and equivalent arrangements as may be included within the spirit and scope of the invention.

DESCRIPTION OF THE INVENTION

Referring now more particularly to the drawings, there is shown an illustrative transport vehicle 5 in the form of a truck having a cab 6 and a trailer 7. The trailer comprises a flat bed 8 supported by wheels 9 and may be removably connected to the cab in a conventional manner. A removable and reusable container 10 of the type commonly referred to as "intermodal" or "land-sea" is supported on the trailer bed 8 and forms the transport body of the vehicle. It will be understood that while a trailer truck is shown in the illustrated embodiment, the invention is similarly applicable to other forms of transport vehicles, such as railroad cars.

Figure 3:
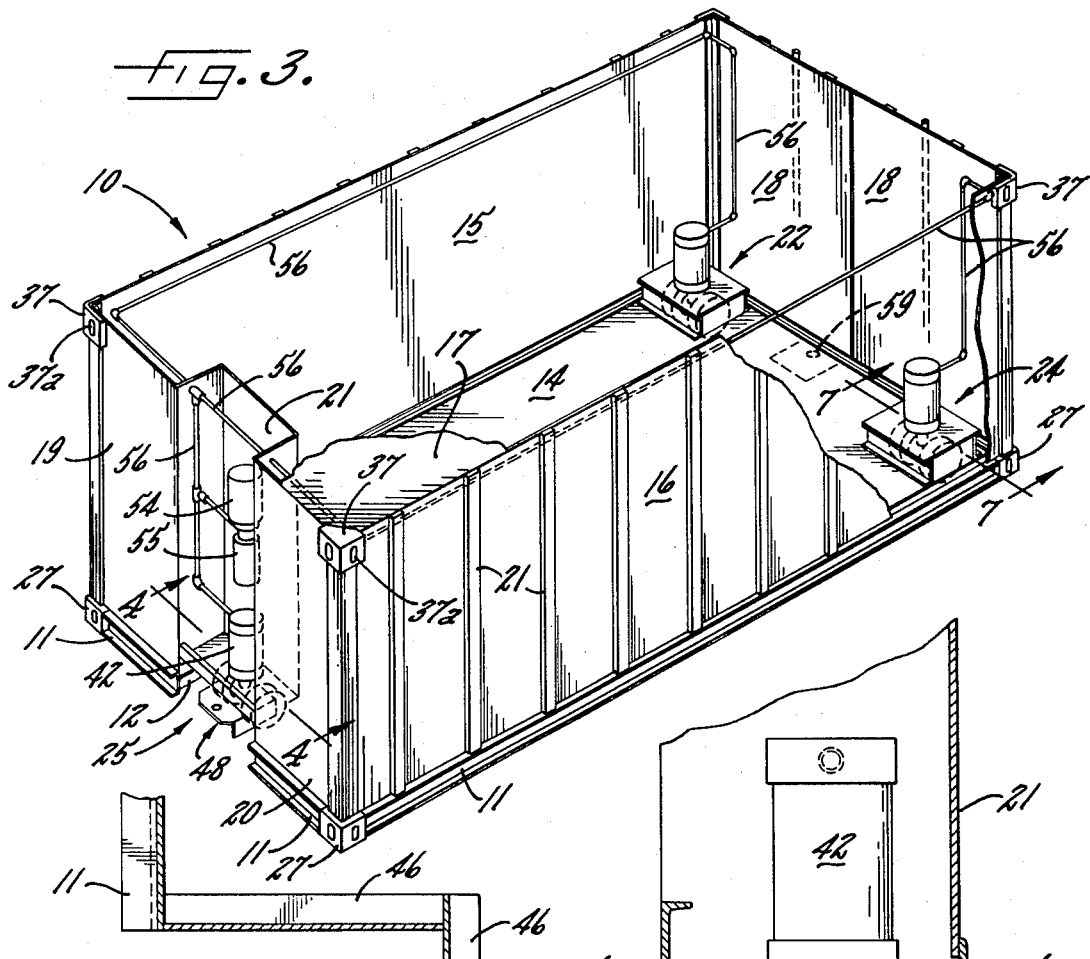
FIG. 3 is an enlarged perspective view, partly in section, of the freight hauling and storing container shown in FIG. 1.

The illustrated container, as best shown in FIG. 3, includes a rectangular base and frame construction that comprises a surrounding channel beam frame 11, recessed at the forward end by a generally U-shaped portion 12 of channel beam construction, with a base or platform surface for a load. Reinforcing beams, not shown, may extend from one side of the channel beam to the other, and/or from front to rear of the container, to afford additional support for the base or platform 14.

As indicated, the platform 14 is generally rectangular, and is within the periphery of the rectangle defined by the channel beam framework 11. Indeed, a particular feature of the invention, as noted earlier, is that essentially all elements of the container remain within the periphery of the framework beams 11 so that several containers may be placed immediately adjacent each other without interference from protuberances in any direction. Minor protuberances or extensions may, of course, be desirable or necessary, depending upon the details of construction, without departing from the spirit and scope of the invention.

Around the sides and ends of the framework 11 are positioned the upstanding walls, particularly the generally flat side walls 15 and 16, the generally flat end wall 18, and a forward or leading end wall 19, 20, interrupted by a generally U-shaped portion 21 conforming to the similarly shaped portion 12 of the framework 11. Where desired, the several walls may be stiffened by a series of vertical cleats 21 which, as the platform 14 and the several walls 15 through 20, inclusive, are desirably made of metal. The cleats 21 are secured, as by welding, to the framework 11, while the several upstanding walls which define the freight receiving container may be welded or bolted to each other and to the framework 11. To enclose and seal the container 10 there is provided a top panel 17, partially shown in FIG. 3. The end wall 18 may be formed from a pair of doors, as shown in FIG. 3, to permit access to the interior of the container for loading and unloading purposes.

Figure 2:
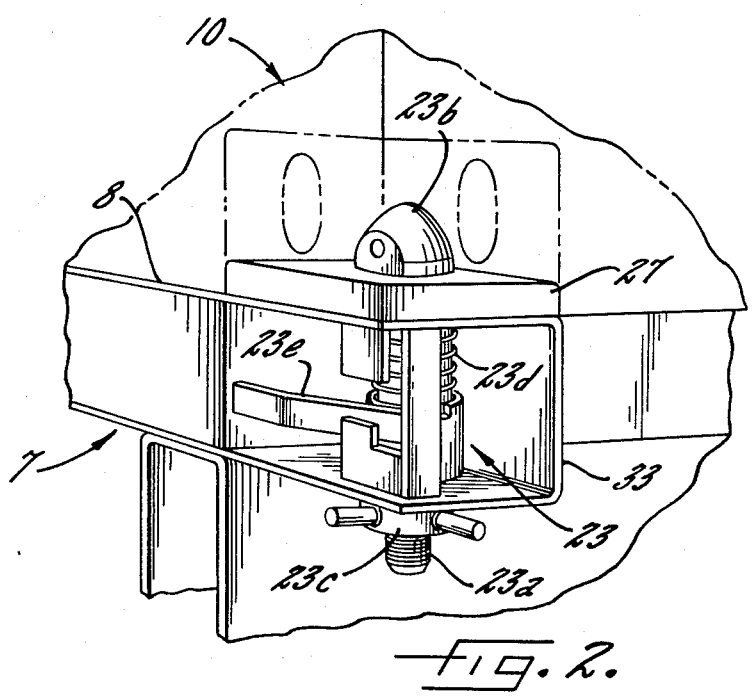
FIG. 2 is an enlarged perspective, partially in section, showing the twist lock means for releasably securing the container shown in FIG. 1 to the vehicle trailer bed.

To releasably secure the container 10 to the trailer bed 8 conventional twist locks 23 are provided at each corner of the trailer bed. Each bottom corner of the container 10 has a corner casting 27 formed with an elongated bottom aperture (not shown) adapted to receive a respective one of the twist locks, as shown in FIGS. 1 and 2. The castings 27 are appropriately fitted at the corners of the beam frame 11 so as not to significantly protrude outward from the container.

The illustrated twist locks 23 each have a vertical stem 23a with an elongated head 23b at the upper end thereof protruding above the upper surface of the trailer bed 8. The stem 23a is supported within a channel 33 of the framework of the trailer bed 8 for rotational and limited axial movement, and a handle 23e engages the stem through a surrounding hub to facilitate rotational movement of the stem. A coil spring 23d surrounding the stem 23 biases the stem in a upward direction, and a nut 23c threadably engages the lower end of the stem for drawing the stem downward against the bias of the spring 23d. As will be apparent, the container may be placed upon the trailer bed so that each elongated slot in the bottom of the corner castings 27 is positioned over one of the upstanding twist lock heads 23b. By rotating the head 23b by means of the handle 23e so that it is oriented in a different direction than the corner casting slot, the head will engage the corner casting. The nut 23 then may be rotated to cause the stem to pull the corner casting into tight rigid engagement with the trailer bed.

Each upper corner of the illustrated container 10 also is provided with a corner casting 37, which is similar to the lower castings 27. It will be understood by those skilled in the art that appropriate side apertures 37a formed in the upper corner castings 37 may be engaged by hooks of conventional fork lift attachments to permit lifting of the container to and from a trailer or dock when such equipment is available.

In accordance with the present invention, means are provided for readily converting the container from an immobile frame base storing container to a mobile wheeled hauling container for easy transfer and placement after release and/or removal of the container from the transport vehicle trailer. To provide for such selective mobility or immobility of the container 10 at least three retractable and extensible dolly systems are included. As shown in the preferred arrangement depicted in FIG. 3, these include first and second dollies 22, 24 near the corners of the framework 11 at one end, and a third, pivotable, dolly 25 near the center of the opposite end to form a tricycle-like arrangement.

Construction details of the first and second dollies 22, 24 are shown in FIGS. 7 and 8 with the dolly wheels 28 being drawn in solid lines in their retracted position and in phantom lines in their fully extended position. It will be noted that in the former, or retracted, position the wheels 28 terminate above or retracted, position the wheels 28 terminate above the bottom level of the framework 11 so that the container, in that event, rests on the trailer bed or ground with the framework 11 making direct contact to insure absolute immobility of the container with the wheels retracted. Conversely, when the wheels 28 are in their fully extended position, as indicated in phantom, the wheels extend below the framework 11 to lift and thereby support the container with the framework 11 above ground level. Thus, full mobility is insured when desired, but only when desired.

The dolly 24 is indicated as having a pair of dolly wheels 28 journalled on a common axle 29, and spaced apart so that an intermediate portion of the axle 29 can be journalled to a depending ear 30. This ear 30 is connected to a shaft 31 mounted onto the piston of a hydraulic cylinder 32; preferably the shaft 31 is non-round to prevent the shaft 31 from rotating about a vertical axis and thereby to insure that the wheels 28 remain aligned with the length of the container.

Mounting of the hydraulic cylinder 32 is advantageously effected by removably securing the cylinder base 34 to channel beams 35 mounted onto the framework 11 via gusset plates 36. Thus, the hydraulic cylinder 32 and its depending dolly wheels 28 are directly supported and carried by the strong framework channel beams 11, and yet the entire dolly 24 assembly may be removed for servicing.

Figure 5:
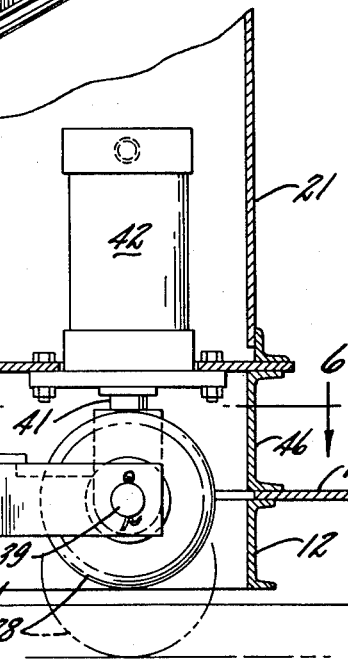
FIG. 5 is a partial side view, taken in section, along lines 5—5 of FIG. 4, again illustrating the retracted (solid lines) and extended (phantom lines) positions of the dolly.
Figure 6:
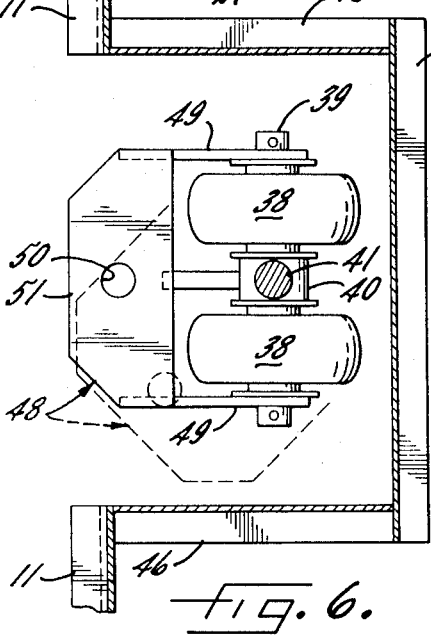
FIG. 6 is a top view, taken along lines 6—6 of FIG. 5, depicting the front dolly and front towing system.

A third retractable and extensible dolly 25 is located near the center of the opposite end of the framework 11, and in this regard attention is again invited to FIG. 3 for an over-all perspective and to FIGS. 4 through 6 for construction and operation details. In substance, the front dolly 25 includes a pair of dolly wheels 38 journalled on a common shaft 39, the wheels 38 being spaced to permit an ear 40 to receive the shaft 39 and, in turn, to be connected to a vertically depending shaft 41 connected to a piston in the hydraulic cylinder 42. As with the cylinder 32 of FIGS. 7 and 8 for the rear dollies 22, 24, the front hydraulic cylinder 42 is carried by the framework channel beams 11 via additional channel beams 46 and a detachable base 44.

In contrast to the non-round hydraulic piston rods or shafts 31 of the rear dollies 22, 24 (FIGS. 7 and 8), the corresponding shaft 41 of the front dolly 25 (FIGS. 4-6) is advantageously round in cross sectional view. This permits the wheel 38 to be pivoted horizontally about the vertical axis of the shaft 41 so as to permit the container 10 to be manuvered by either pushing or pulling a drawbar mounting 48 connected to the pivotable dolly 25 via the shaft 39 and extensions 49. The drawbar 48 is additionally equipped with a hitch, for illustrative purposes, represented merely as a bar-receiving port 50 in the horizontal plate 51.

FIG. 6 additionally shows that the U-shaped portion 12 recessed into the generally rectangular framework 11 is sufficiently wide to permit the drawbar assembly 48 to be rotated without interference. This portion 12 additionally serves to house a 12-volt direct current motor 54 and a hydraulic pump at the bottom of a hydraulic fluid reservoir 55 (FIGS. 3 and 4). The pump discharge supplies pressure to each of the three hydraulic cylinders via conduits 56, which for simplicity are merely shown as being a single conduit, although it will be appreciated that, particularly for the large size containers requiring heavy dollies, it is frequently desirable to provide two or more hydraulic fluid conduits to each cylinder to permit fluid to be applied selectively to the top or to the bottom of the piston, depending on whether wheels are to be lowered or raised. Details of such hydraulic systems are readily supplied by hydraulic system designers.

Alternatively, a pneumatic system may be used to replace the hydraulic one. Each system has well recognized advantages and disadvantages, and again particular insulations and designs are available or readily custom-manufactured.

A particular feature of the invention is that the hydraulic or pneumatic system for retracting and extending the dolly wheels is self-contained, requiring only electric power supplied via cord 58 (FIG. 4) to the motor 54 in order to extend the dolly wheels. As a result, only a low voltage power supply need be furnished to the container system in order to convert the container from an immobile storage container to a mobile hauling unit.

It is desirable for many purposes to standardize the overall dimensions and other component sizes of the container. It has been found that a container having a length of 20 feet and a width of 8 feet, in each case maximum, provides exceptional versatility and compatibility with existing flat bed truck and rail equipment. A container height of about 8 feet, measured from the base of the framework 11, is also convenient, although this dimension offers some flexibility of choice inasmuch as the containers will ordinarily not be stacked one on top of each other.

Some additional features of the container are worthy of note. Firstly, the drawbar assembly 48 (FIGS. 3, 5 and 6) advantageously does not protrude from the rectangular framework 11, nor does a somewhat similar, although fixed, rear drawbar assembly 59 (FIG. 3). Second, the use of both front and rear drawbar assemblies permits successive containers to be joined end-on-end and to be towed by a single tractor. Third, as indicated briefly in connection with the previous description of the dolly mountings, each of the three dollies 22, 24, 25 (FIG. 3) is so mounted that the wheels are isolated from the container interior in order to preserve integrity of the interior contents.

Thus there has been provided, in accordance with the invention, a transport vehicle with a unique reusable freight hauling and storage container that is readily converted, by self-contained mechanisms, from an immobile frame-based container to a mobile wheeled truck-like unit.

I claim:

1. A reusable freight hauling and storing container for use as the body of a transport vehicle such as a truck, railroad car, and the like, comprising in combination a generally rectangular load-supporting base, side and end walls extending upwardly from said base defining a freight receiving area, first and second retractable and extensible wheel means located near the corners at one end of said base and within the outer periphery of said side and end walls, a third retractable and extensible wheel means located within the outer periphery of said side and end walls near the opposite end of said rectangular base, said third wheel means being pivotably movable about a vertical axis to permit grinding of said container, said retractable and extensible wheel means each having an associated vertically positioned hydraulic cylinder, an electric-powered hydraulic pump with an associated hydraulic fluid reservoir for operating said hydraulic cylinders to simultaneously retract and extend said wheel means, a relatively low voltage direct current electric motor for powering said pump, said electric-powered hydraulic pump, hydraulic fluid reservoir, and electric motor all being contained within the outer periphery of said container walls, said container being positionable on said base to form an immobile storing container when said wheel means are in a retracted position, and said container being supported by said wheel means when said wheel means are in an extended position for movement on said wheel means in the longitudinal direction of said side walls.

2. A transport vehicle comprising a bed supported on a plurality of wheels, a removable and reusable freight hauling and storing container mountable on said bed, said container having a rectangular base and upstanding side and end walls defining a freight-receiving receptacle, said sidewalls having a length greater than the width of said end walls, retractable and extensible wheel means mounted within the outer periphery of said end and side walls, fluid operated means for selectively retracting and extending said wheel means, electric motor means for powering said fluid operated means, said fluid operated means and said electric motor means both being recessed within the outer periphery of said container walls, said container base being positionable on said bed when said wheel means are in a retracted position, means for releasably securing said container to said bed when said wheel means are in said retracted position, said container being supportable by said wheel means on said bed when said wheel means are in an extended position for longitudinal movement with respect to said bed, and at least one of said wheel means being pivotably movable about a vertical axis to permit guiding of said container.

3. The transport vehicle of claim 2 wherein each of said wheel means includes a pair of wheels and a connecting axle, and wherein said retracting and extending means is connected to said axle intermediate of said wheels.

4. The transport vehicle of claim 3 including forward tow means carried by said third wheel means, and rear tow means carried by said base.

5. The transport vehicle of claim 2 wherein said fluid operated means includes a hydraulic pump and a hydraulic fluid reservoir, and said electric motor means is a direct current electric motor requiring a relatively low voltage of about 12 volts.

6. The transport vehicle of claim 5 in which said container has apertured corner members at each corner thereof, and said container securing means cooperates with the corner members at the bottom of said container for securing said container to said base.

7. The transport vehicle of claim 6 including a portable battery means for energizing said electric motor.

8. The transport vehicle of claim 6 in which said container securing means includes a plurality of twist locks each adapted to cooperate with one of said lower corner members when said container is mounted on said bed.

* * * * *